United States Patent [19]

Miller

[11] 4,031,971

[45] June 28, 1977

[54] JET NOZZLE DRILLING ASSEMBLY

[75] Inventor: Thomas R. Miller, Waynesburg, Pa.

[73] Assignee: Continental Oil Company, Ponca City, Okla.

[22] Filed: Oct. 8, 1976

[21] Appl. No.: 730,883

[52] U.S. Cl. .......................... 175/107; 15/104.12; 175/67; 175/422; 239/259
[51] Int. Cl.² ...................................... E21B 1/06
[58] Field of Search ............ 15/104.12; 175/67, 92, 175/107, 422; 239/251, 259, 261

[56] References Cited

UNITED STATES PATENTS

| 142,992 | 9/1873 | Cross | 175/107 |
| 1,060,929 | 5/1913 | Monberg | 175/107 |
| 2,218,130 | 10/1940 | Court | 175/92 X |
| 3,844,362 | 10/1974 | Elbert et al. | 15/104.12 X |

Primary Examiner—Ernest R. Purser
Assistant Examiner—Richard E. Favreau
Attorney, Agent, or Firm—Richard W. Collins

[57] ABSTRACT

A drilling assembly including a jet nozzle bit rotatable on a fluid supply shaft. The assembly includes a bearing housing protected by seals and vent ports to prevent fluid which has leaked between the fluid supply shaft and the jet nozzle bit from contaminating the bearings.

4 Claims, 2 Drawing Figures

JET NOZZLE DRILLING ASSEMBLY

BACKGROUND OF THE INVENTION

1. Field of the Invention

This invention relates to drilling assemblies of the type used to drill holes in a subterranean formation, and more particularly to drilling assemblies utilizing the cutting action of a plurality of small high pressure fluid streams directed against the face of a formation being drilled. Drills of this general type are frequently used to drill through coal formations to provide openings in the formation through which methane gas can be vented or removed by vacuum.

2. Description of the Prior Art

As noted above, drilling assemblies of the general type to which this invention relates are known. One such assembly is described in my copending application Ser. No. 667,785 filed Mar. 17, 1976. The device described in that application is in many respects similar to the device of the present invention, which is best described as an improvement thereover.

SUMMARY OF THE INVENTION

According to the present invention, a drilling assembly is provided for drilling a hole through a subterranean formation. The assembly includes a fluid supply shaft with a jet nozzle bit rotatably mounted on the end of the shaft. High pressure fluid supplied through the fluid supply shaft jets through a plurality of nozzle openings in the bit at an angle selected to impart rotational forces to the bit and to erode away the face of a formation through which a hole is being drilled. The bit itself is not intended to contact the formation, and the cutting action is provided by the fluid streams impinging against the formation face.

The bit is rotatably mounted on the end of the fluid supply shaft, which does not turn, and the bit is attached to a bearing housing which rotates with the bit about the end of the shaft. Suitable bearings and retainer means are provided to allow rotation of the bit and to retain the bit in position longitudinally relative to the shaft.

The essence of this invention is in the provision of vent means through the bearing housing such that any high pressure fluid leaking between the fluid supply shaft and the rotatable bit can be vented out of the assembly and will not be forced into the bearing section. Preferably, suitable seals are provided at each end of the bearing section to assist in keeping this high pressure fluid as well as other contaminants out of the bearing section.

It is an object of the invention to provide an improved jet nozzle drilling assembly.

It is a further object to provide such an assembly having provision for eliminating or minimizing contamination of its bearing section.

DESCRIPTION OF THE PREFERRED EMBODIMENT

Figure 2:
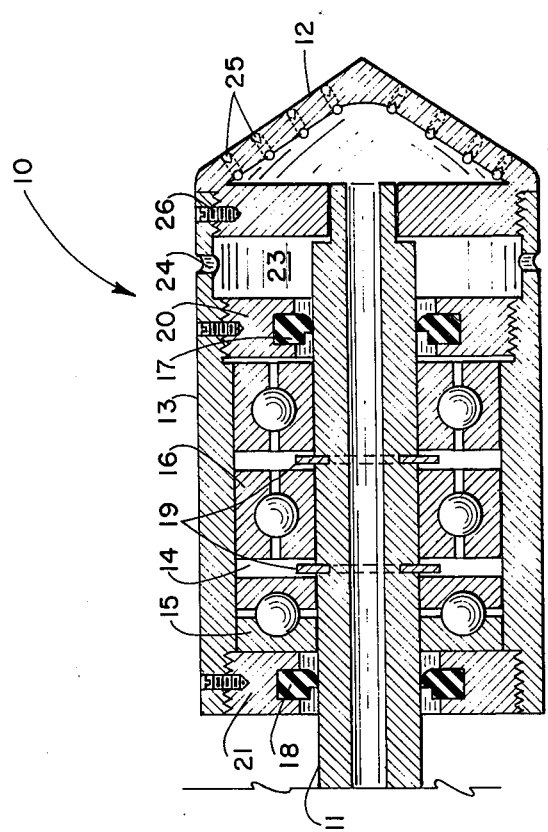
FIG. 2 is a longitudinal cross section taken through the line 2—2 of FIG. 1 showing the construction of a drilling assembly in accordance with the invention.
Figure 1:
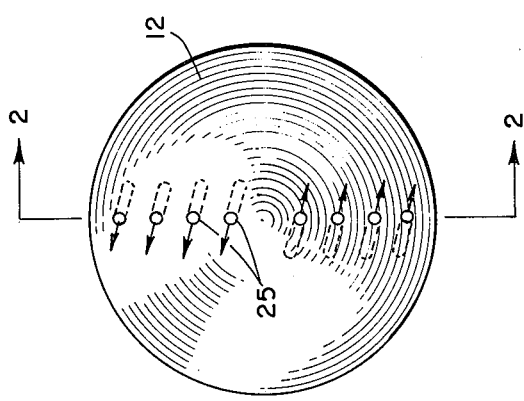
FIG. 1 is an end view of a bit in accordance with the invention, illustrating the directional nature of fluid streams exiting the bit.

The most preferred embodiment of the invention, the details of which are best illustrated in FIG. 2, will now be described.

The drilling assembly 10 includes a fluid supply shaft 11 having a central fluid passage therethrough. High pressure fluid passes through shaft 11 and out orifices 25 in bit 12 which is rotatably mounted on the reduced diameter end section of shaft 11. Housing 13 is attached to bit 12 by threads and set screw 26 and extends rearwardly over a portion of shaft 11, forming an annular cavity or bearing section 14 which contains thrust bearing 15 and radial bearings 16. The ends of bearing section 14 are formed by forward seal retainer ring 20 and rear seal retainer ring 21 and forward seal 17 and rear seal 18. Snap rings 19 positioned in grooves formed in shaft 11 act to hold the entire bit assembly in place longitudinally on the shaft 11.

It will be apparent from consideration of the above-described assembly that there is a possibility of high pressure fluid leaking out between the bit 12 and shaft 11 even though bit 12 and shaft 11 are machined to a close tolerance fit. As will also be apparent, any fluid leaking between the bit and shaft would tend to be forced into bearing section 14 unless some provision is made to prevent this.

According to the invention, vent port 24 is provided through housing 13 such that any fluid leaking between the bit 12 and shaft 11 can pass first into an annular void chamber 23 between bit 12 and forward seal retainer 20 and thence out through vent port 24. Several such vent ports 24 are preferably provided. As a result of this arrangement, high pressure fluid does not contact forward seal 17 and contamination of bearing section 14 is prevented.

The fluid which passes out nozzle orifices 25, after impinging against the face of the formation being drilled, passes back over the drilling assembly 10 and washes formation cuttings out of the hole being drilled.

Thus, bearing life and lubricant retention are greatly improved compared to a similar drilling assembly without the provision of vent means for conveying leaked fluid out of the housing.

The manner of operation of drilling assembly 10 is believed to be clear from the foregoing description thereof, but will be briefly described as it would be used to drill a horizontal methane gas relief hole in a subterranean coal formation. First, a large diameter shaft would be drilled from the surface to the formation. Then, before extensive mining operations are begun, a series of radial small diameter holes would be drilled outwardly into the formation utilizing the device of the invention. To accomplish this, the bit and housing are attached to the end of fluid supply shaft 11, and fluid shaft 11 is attached to a high pressure pump or other source of high pressure fluid. Fluid flowing through shaft 11 exits from nozzle orifices 25 forming a series of small high pressure cutting streams. The orifices 25 are disposed at a slight angle to impart a rotational motion to bit 12 causing bit 12 and housing 13 to rotate at high speed. As the high pressure streams cut into the face of the formation, shaft 11 is fed into the resulting hole. As drilling progresses, additional sections of fluid supply shaft are attached and fed into the hole. The fluid from bit 12, including any small amount leaking out through vent port 24, returns to the mine shaft where it is disposed of or reused. Upon completion of the desired number of small radial holes, the large diameter shaft is left open, or subjected to vacuum if desired, for a time sufficient to let methane gas escape from the coal formation. After sufficient methane has been removed to enable safe operation, regular mining of the coal formation is begun.

Numerous modifications and variations could be made by those skilled in the art, both as to details of construction of the drilling assembly of the invention and the use thereof, without departing from the true scope of the invention, which is defined by the appended claims:

I claim:

1. In a drilling assembly comprising
   a. a fluid supply shaft;
   b. a jet nozzle rotatably mounted on an end of said fluid supply shaft and having a plurality of outlet ports adapted to impart rotational force to said nozzle upon passage of fluid through said ports;
   c. a housing affixed to said nozzle and extending rearwardly therefrom to encompass a portion of said fluid supply shaft;
   d. a bearing section between said fluid supply shaft and said housing, said bearing section including thrust bearing means and radial bearing means; and
   e. retaining means connected to said fluid supply shaft and adapted to retain said nozzle, housing and bearing means in position on said fluid supply shaft;
   the improvement comprising:
   vent means providing an unrestrained fluid passage from the rear of said nozzle to the exterior of said housing whereby pressurized fluid leaking between the fluid supply shaft and the nozzle may pass freely to the exterior of the housing, thereby avoiding fluid contamination of said bearing section.

2. The drilling assembly of claim 1 wherein the improvement further comprises a seal positioned between said bearing section and said vent means.

3. The drilling assembly of claim 2 wherein the improvement further comprises a seal at the rear of said housing to prevent contamination of said bearing section.

4. The drilling assembly of claim 2 wherein the improvement further comprises an annular void chamber between said nozzle and said seal and wherein a plurality of vent ports extend through said housing in fluid communication with said annular void chamber.

* * * * *